United States Patent [19]

Gibson et al.

[11] Patent Number: 4,938,946
[45] Date of Patent: Jul. 3, 1990

[54] LUNAR HYDROGEN RECOVERY PROCESS

[75] Inventors: Michael A. Gibson; Christian W. Knudsen, both of Houston, Tex.

[73] Assignee: Carbotek, Inc., Houston, Tex.

[21] Appl. No.: 181,318

[22] Filed: Apr. 13, 1988

[51] Int. Cl.$^5$ ............................................. C01B 3/02
[52] U.S. Cl. ............................ 423/648.1; 23/293 R; 423/DIG. 16
[58] Field of Search .................. 423/648.1, DIG. 16; 23/293 R

[56] References Cited

U.S. PATENT DOCUMENTS 3,304,249  2/1967  Katz ..................................... 204/164

OTHER PUBLICATIONS

James L. Carter, "Lunar Regolith Fines: A Source of Hydrogen", *Lunar Bases and Space Activities of the 21st Century*, W. W. Mendell, Editor, Copyright 1985 by the Lunar and Planetary Institute, pp. 571–581.
"Conceptual Design of a Lunar Colony," Sep. 1972 NASA Grant NGT 44-005-114, editor, Charles Dalton, pp. 203–237.
Paper No. 19 of application Ser. No. 06/162075 (reissue of U.S. Pat. No. 4,132,557).

*Primary Examiner*—Robert L. Stoll
*Assistant Examiner*—Wayne A. Langel
*Attorney, Agent, or Firm*—Neal J. Mosely

[57] ABSTRACT

A manufacturing plant and process for production of hydrogen on the moon uses lunar minerals as feed and a minimum of earth-imported, process materials. Lunar feedstock is the pulverized surface layer of lunar soil known as regolith. The regolith contains up to about 150 ppm (wt.) hydrogen presumably derived from the "solar wind". The regolith is screened and fines of less than 200 micron size are recovered. The 200 micron, and smaller, particles are introduced into a fluidized bed reactor and fluidized in a hydrogen gas stream at a temperature of about 600° C. The off-gas is passed through an absorber to separate by-product gases, such as hydrogen sulfide, which may be generated in the process, part of the hydrogen is removed to storage, and the remainder is recycled to fluidize the reactor. The recovered raw product gas is preferably further treated using combinations of selected membrane permeations and cryogenic distillations to purify product hydrogen and recover byproduct $^3$He, $^4$He, $N_2$, carbon oxides, hydrogen sulfide and other species desorbed with the hydrogen.

24 Claims, 2 Drawing Sheets

LUNAR HYDROGEN RECOVERY PROCESS

BACKGROUND OF THE INVENTION

1. Field of the Invention

This invention relates to a new and improved process and associated apparatus for recovery of hydrogen from lunar soil.

2. Brief Description of the Prior Art

The incentive for oxygen production on the moon is primarily the increased payload thereby made possible for other space missions which then do not have to carry all their propellant and life-support oxygen from earth. Also, oxygen produced on the moon requires much less launch energy and propellants to transport it to another space use, such as a space station, than oxygen launched from the deep gravity well of earth. An oxygen plant is therefore a key facility in a manned lunar base or colony.

In applicants' co-pending U.S. patent application Ser. No. 118,414, a process is shown and described for production of oxygen from lunar materials by reduction of iron-oxygen compounds with hydrogen. The process requires beneficiation and mineral separation steps upstream of the reduction reactor and chemical or physical techniques downstream to extract the oxygen and regenerate the reducing agents. The hydrogen used in the initial operation of the process is transported from earth. However, for extended operation, the process is more practical if it can utilize hydrogen recovered from lunar materials.

The presence of hydrogen in lunar soil was expected on theoretical grounds, even before the first manned lunar landings. It was known that the energy emitted by the sun includes protons (positively charged hydrogen nuclei) in the form of a "solar wind". In the several billion year history of the solar system, the protons emitted by the sun must have collected, in part, in the soil or surface materials of the moon. The actual presence of hydrogen in lunar materials was detected early in the lunar exploration programs.

Epstein S. and Taylor H. P., Jr. (1970) Proc. Apollo 11 Sci. Conf. 1085-1096 reports the concentration and isotopic composition of hydrogen, carbon and silicon in Apollo 11 lunar rocks and minerals. Chang S., Lennon K., and Gibson E. K., Jr. (1974) Proc. Lunar Sci. Conf. 5th, 1785-1800 reports Abundances of C, N, H, He, and S in Apollo 17 soils from Stations 3 and 4: Implications for solar wind exposure ages and regolith evolution. Carr R. H., Bustin, and Gibson, E. K., Jr. (1986) submitted to *Analytic Chemistry* reports the determination of hydrogen in lunar soils by pyrolysis—gas chromatography. Bustin R., (1986) in a final report prepared for Northrop Services, Inc. reports on hydrogen abundance in lunar soils. Bustin (1986) also reports the yields of other species desorbed with the hydrogen, viz., helium, nitrogen and carbon oxides. A report by Wittenberg, L. J. (1986) and others at the University of Wisconsin Fusion Technology Institute, *Fusion Technology* 10 (2), September 1986, points out that the lunar helium is much richer in isotope weight 3, a desirable fusion reactor fuel, than terrestial helium. Consequently, the separation and purification of $^3He$ and possibly other byproducts from the main hydrogen product may be attractive.

The literature relating to analysis of lunar soil samples and minerals reports appreciable amounts of hydrogen in the surface soils but offers no suggestion as to the practicality of recovering hydrogen or the process or apparatus which might be required for hydrogen recovery.

SUMMARY OF THE INVENTION

One of the objects of this invention is to provide a new and improved integrated lunar hydrogen recovery process and related apparatus.

Another object of this invention is to provide a new and improved integrated lunar hydrogen recovery process and related apparatus for supplying hydrogen required in an integrated process for production of oxygen and usable by-products from lunar materials.

Another object of this invention is to provide a new and improved lunar hydrogen recovery process and related apparatus in which lunar regolith is separated from the surface layer of lunar soil, small size particles recovered therefrom, and the particles heated in a fluidized bed in which the fluidizing ga strips the adsorbed hydrogen from the soil particles.

Another object of this invention is to provide a new and improved lunar hydrogen recovery process and related apparatus in which small particles of lunar regolith are recovered from the surface layer of lunar soil, particles 200 microns and smaller are recovered therefrom, and the particles heated in a fluidized bed in which hydrogen is used as the fluidizing gas and strips the adsorbed hydrogen from the soil particles.

Another object of this invention is to provide a new and improved lunar hydrogen recovery process and related apparatus in which small particles of lunar regolith are recovered from the surface layer of lunar soil, particles 200 microns and smaller are recovered therefrom, and the particles heated to about 600° C. in a fluidized bed at low pressure in which hydrogen is used as the fluidizing gas and strips the adsorbed hydrogen from the soil particles.

Another object of this invention is to provide a new and improved lunar hydrogen recovery process and related apparatus in which small particles of lunar regolith are recovered from the surface layer of lunar soil, particles 200 microns and smaller are recovered therefrom, and the particles heated to about 600° C. in a fluidized bed at low pressure in which hydrogen is heated by an RF dielectric heater to 600° C. and used as the fluidizing gas to strip the adsorbed hydrogen from the soil particles.

Another object of this invention is to provide a new and improved lunar hydrogen recovery process and related apparatus in which small particles of lunar regolith are recovered from the surface layer of lunar soil, particles 200 microns and smaller are recovered therefrom, and the particles heated to about 600° C. in a fluidized bed at low pressure in which hydrogen is heated by an RF dielectric heater to 600° C. and used as the fluidizing gas to strip the adsorbed hydrogen from the soil particles, part of the hydrogen is separated and recovered from the fluidizing gas stream and the remainder recycled to the fluidized bed.

Another object of this invention is to provide a new and improved lunar hydrogen recovery process and related apparatus in which small particles of lunar regolith are recovered from the surface layer of lunar soil, particles 200 microns and smaller are recovered therefrom, and the particles heated to about 600° C. in a fluidized bed at low pressure in which hydrogen is heated by an RF dielectric heater to 600° C. and used as the fluidizing gas to strip the adsorbed hydrogen from the soil particles, part of the hydrogen is separated and recovered from the fluidizing gas stream and the remainder recycled to the fluidized bed and the recovered raw product gas is further treated using combinations of selected membrane permeations and cryogenic distillations to purify product hydrogen and recover by-product $^3$He, $^4$He, $N_2$, carbon oxides, hydrogen sulfide and other species desorbed with the hydrogen.

Other objects and features of the invention will become apparent from time to time throughout the specification and claims as hereinafter related.

The above noted objects and other objects of the invention are accomplished by a manufacturing plant and process for production of hydrogen on the moon which uses lunar minerals as feed and a minimum of earth-imported, process materials. Lunar feedstock is the pulverized surface layer of lunar soil known as regolith. The regolith contains up to about 150 ppm (wt.) hydrogen presumably derived from the "solar wind". The regolith is screened and fines of less than 200 micron size are recovered. The 200 micron, and smaller, particles are introduced into a fluidized bed reactor and fluidized in a hydrogen gas stream at a temperature of about 600° C. The off-gas is passed through an absorber to separate by-product gases, such as hydrogen sulfide, which may be generated in the process, part of the hydrogen removed to storage, and the remainder recycled to fluidize the reactor. The recovered raw product gas is preferably further treated using combinations of selected membrane permeations and cryogenic distillations to purify product hydrogen and recover by-product $^3$He, $^4$He, $N_2$, carbon oxides, hydrogen sulfide and other species desorbed with the hydrogen.

DESCRIPTION OF THE PREFERRED EMBODIMENTS

Figure 1:
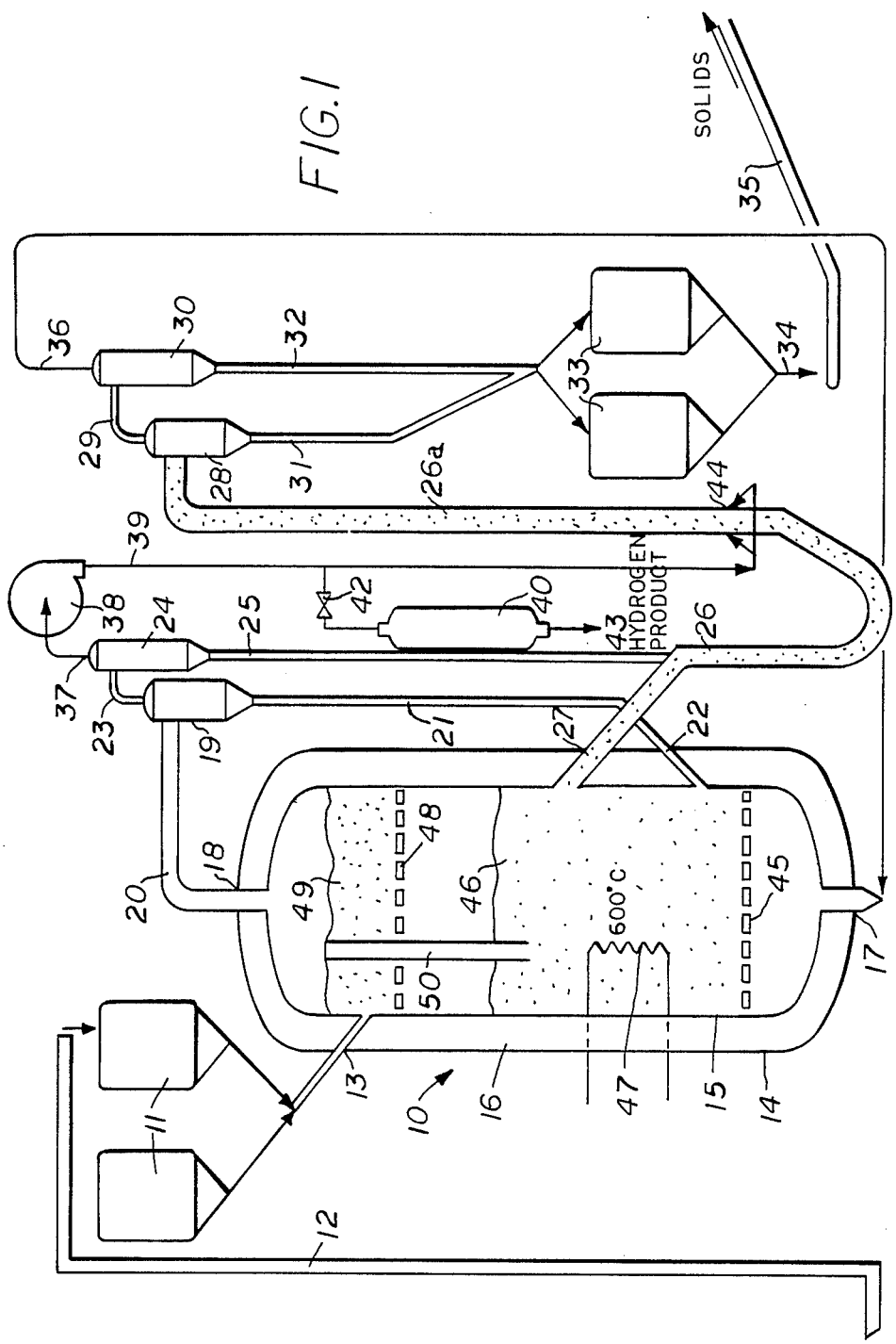
FIG. 1 is a schematic flow diagram of an integrated lunar hydrogen recovery process and apparatus utilizing direct heating of the solids in a fluidized bed reactor and preheat of recycle hydrogen against spent solids in a recycle transfer line prior to discharge of spent solids from the process.

Referring to the drawings, it is seen that a schematic flow diagram of one embodiment of a hydrogen recovery process is shown in FIG. 1. The overall process will be described generally referring to FIG. 1 with a more detailed description of the apparatus used. The size of the apparatus required was taken to be that amount of hydrogen which would just combine with the oxygen product of a hypothetical lunar oxygen plant producing 1,000 metric tons per year. Twice the molar amount at one-sixteenth the molar weight of oxygen results in one-eighth the annual weight or 125 metric tons of hydrogen per year.

Mining activity for oxygen production in support of a permanent lunar base presumes the surface mining of lunar regolith (soil) in an area of high-titanium basaltic rock in lunar mare regions. This fine comminuted rock is readily removed by simple excavation methods. The particular soil used in mining and processing considerations is Apollo mare soil 71061; particle sizes, relative weight fractions, and soil composition are described in references. This soil contains approximately 10 wt. % ilmenite, with the mineral predominating in the smaller fractions. The 45 to 90 micron cut was estimated to contain about half of the total sample ilmenite or to be approximately 20 wt. %. Alternatively, basaltic rock below the regolith may be mined, crushed and ground, and classified to the desired particle size for use in the process.

Ilmenite recovery and concentration during beneficiation determines the size of the mining activity together with the reactor feed rate. Assuming beneficiation and reaction plant service factors of 75%, but mining operations only during the lunar day with allowance for start-up/shut-down time limiting mining service factor to 35%, mining rates of approximately 40 metric tons per hour are needed (about 25 cubic meters or 30 cubic yards) for a plant producing 1,000 metric tons of oxygen annually. Details of the oxygen production process and associated apparatus are shown and described in applicants' co-pending U.S. patent application Ser. No. 118,414. The process and apparatus used in the recovery of hydrogen are based on the use of at least some of the materials recovered for the production of oxygen.

In the oxygen producing process, front shovels are used for mining of lunar soil. These devices are similar to the generally smaller back-hoe excavators, but have the advantage of maintaining a smooth floor while working receding walls in a gradually expanding shallow pit mine. They are capable of digging below floor level in contrast to front-end loaders and can develop the ramps necessary for open-pit mining. Depth of a lunar pit mine is best at two meters or so for oxygen production. Slightly shallower cuts are preferred as feedstock for hydrogen production. The presence of adsorbed hydrogen in the regolith essentially disappears in samples taken below 2.6 meters in depth. Mature lunar soils (see categorization of immature, sub-mature and mature soils in *Handbook of Lunar Soils*, Morris R. V., Score R., Dardano C., and Heiken G., NASA Johnson Space Center (1983)) are preferred feeds. Particle sizes of 200 microns and less of such feeds are most practical for hydrogen recovery.

As described in applicants' co-pending application, front shovels are designed to exert considerable forward force (crowd) in digging the shovel into the mine wall. Similarly, they have considerable break-out force to extract the shovel with a full load of material. Further, front shovels readily clear and load trucks which can dump near the beneficiation plant. Based on terrestrial experience, these trucks may carry considerably more than their weight so that a 15 metric ton truck could carry 25 metric tons of material or so. The oxygen plant requires about three trucks initially (one spare) and additional capacity is required when this hydrogen recovery process and apparatus are added.

The feedstock requirement calls for 2.1 million metric tons of regolith to be mined yearly. This compares with 206,000 metric tons of regolith mined for the 1,000 metric ton per year oxygen plant of applicants' co-pending patent application. Ten times the mining equipment and weight would be required for hydrogen production given the same procedures, but such large amounts are well within the range of feasibility and effectiveness of Bucket Wheel Excavator technology. However, it is roughly estimated that at least five times the mining equipment weight will be involved as with the oxygen plant, or about 500 metric tons or so.

In the schematic flow diagram of FIG. 1, lunar regolith is used as feed material and is obtained by surface-mining using a combination of front shovel and haul truck machines. Two types of iron-oxygen-bearing minerals, ilmenite ($FeTiO_3$) and $Fe^{+2}$-bearing, glassy agglutinates, are the primary oxygen plant feedstocks, and the mining site is chosen primarily based on their abundance in the regolith. The remaining minerals are mostly silicates which behave as inert diluents in the hydrogen-reduction. Consequently, as shown, the mined regolith is transported in haul trucks to the beneficiation and processing area where the next steps of mineral separations based on size and physical properties afford a sized (20–200 microns) feed concentrate of 80–90 wt % reactive material. Haul trucks return to the mining area with the rejected solids from beneficiation.

Beneficiation of the lunar soil (regolith) to a feedstock of the desired particle size may be by screening and also by the fine particle separatory system described in applicants' co-pending U.S. patent application. A number of large 250 micron screens may be used, given the somewhat inefficient separation of small material of this size. Most of the regolith passing these screens will be less than 200 micron size. If desired, a finer separation of even smaller particles may be obtained using the equipment described in applicants' co-pending U.S. patent application.

A schematic flow diagram of the beneficiation process is shown in FIG. 3 of applicants' co-pending U.S. patent application. The hydrogen recovery process employs fluidized beds described more fully below. Consequently, the feed concentrate particles resulting from beneficiation process steps should be in the size range from about 20 to about 200 microns. The as-mined regolith has been found to contain very few particles larger than 1,000 microns but a substantial number of particles smaller than 20 microns. Consequently, no grinding is required. The feed concentrate for the oxygen process must be heart-cut from the over- and under-size fractions, while the feed for the hydrogen recovery process requires only particle sizes under 200 microns and can use the under 20 micron sizes not used in the oxygen process.

In the beneficiation process, a front-end loader transfers regolith from a storage pile to a bucket elevator which, in turn, feeds a hopper. A screen fed by gravity is sized to remove only the very largest oversize particles, those whose diameter is 1,000 microns or larger. This is because even terrestrial screens have both low throughput and low separation efficiency at mesh sizes much below 1,000 microns, and both these parameters are further reduced by the lowered lunar gravity and high fines content of as-mined regolith.

The under-1,000 micron particles fall by gravity into an electrostatic size separation device. The design of this device has been taken from conceptual and experimental prototype studies at NASA-JSC. See Williams, R. J., McKay, D. S., Giles, D., and Bunch, T. E., "Mining and Beneficiation of Lunar Ores," pp. 275–288, NASA Publication SP-428, 1979. The device requires no fluid media and uses opposed electrostatic and gravitational forces to cause falling, electrified particles trajectories to diverge according to differences in size, density and electrical properties such as dielectric constant, conductivity and charging mechanism.

Particles fall through a plurality of charging electrodes into a region of superposed gravitational and electrostatic fields. The electrostatic field results primarily from a positively charged belt and secondarily from negative charging electrodes. The attractive electrostatic force between the belt and the negatively charged particles depends on the particles' areas (square of diameter) and their dielectric constant and conductivity. The gravitational force depends on the particles' volume (cube of diameter) and their density. The difference between these two forces is a strong function of particle size modified somewhat by differences in the other physical properties.

This results in the trajectory separations shown through a grounded splitter. The smallest particles are most affected by the electrostatic forces and are directed to the under-20 micron channel in the splitter. The desired feed fraction, 20–200 microns, is directed to the center channel while particles larger than 200 microns are the least diverted and fall into the lowest channel. The feed for the hydrogen recovery process may use all of the particles below 200 microns in size.

In FIG. 1, the embodiment shown comprises a fluidized bed reactor 10 which is supplied with a beneficiated feed of mature regolith particles of less than 200 micron size. The feed is supplied from a pair of hoppers 11 fed by a bucket elevator 12. The hoppers introduce the feed through inlet opening 13 in the fluidized bed reactor. Fluidized bed reactor 10 comprises an outer shell 14 and inner shell 15 with a refractory liner 16 between to maintain the reactor contents at the desired operating temperature.

Refractory liner 16 may be constructed from any of several well-known firebrick formulations, however this makes it quite heavy and greatly increase the weight which must be launched from earth. Alternatives which reduce launched weight are to replace the firebrick with space shuttle heat shield tiles which are excellent lightweight insulators or use lunar soil for the lining which would eliminate the need to launch these materials. A fluidizing gas (hydrogen) is introduced through bottom inlet 17 and exits from the outlet 18 at the top of reactor 10. The contents and mode of operation of reactor 10 will be described below.

Five penetrations of the refractory liner are required by the process: solids inlet 13, the fluidizing gas inlet 17; the fluidizing gas (and entrained solids) outlet 18; spent solids outlet 27; and recycle solids inlet 22. In addition, manways (not shown) are provided to allow a space-suited man to enter and perform internal maintenance as in the oxygen producing process of applicants' co-pending U.S. patent application.

Fluidized bed reactor 10 contains gas distributors 45 and 48, and beds 46 and 49 of fluidized solids. Solids move by gravity from top to bottom bed through downcomer 50. Hydrogen gas is introduced at the bottom and moves countercurrently upward through the distributors at the minimum velocity (0.2 ft. per minute) sufficient to fluidize the solids in each of the beds.

Gas distributors 45 and 48 at the base of the respective beds 46 and 49 may be any of several designs including fritted disks, simple perforated plates or perforated plates with attachments such as bubble caps to improve gas distribution and prevent solids weeping through the distributors. The solids downcomer 50 is a vertical tube extending from the free surface of upper bed 49 to a point below the free surface of the bed 46 below. The cross-sectional area and height of the downcomer pipe controls the solids throughput and is sized to account for reduced lunar gravity. The top of the downcomer sets the level of the fluidized solids above distributor plates 48.

A cyclone separator 19 has its inlet connected by a gas transfer line 20 to outlet 18 from fluidized bed reactor 10. The bottom of cyclone separator 19 discharges separated solids through its outlet to dipleg line 21 into inlet 22 which receives recycled solids. Gas transfer line 23 connects the top outlet of cyclone separator 19 to the side inlet to a second cyclone separator 24. The bottom of cyclone separator 24 discharges separated solids through its outlet to dipleg line 25 into transfer line 26 extending from solids outlet 27 on fluidized bed reactor 10.

Transfer line 26, which is a heat exchanger supplying heat to recycle hydrogen, extends from fluidized bed reactor 10 to the inlet side of a third cyclone separator 28. Gas transfer line 29 connects the top outlet of cyclone separator 28 to the side inlet to a fourth cyclone separator 30. The bottoms of cyclone separators 28 and 30 discharge separated solids through their respective outlets to transfer lines 31 and 32 to a pair of hoppers 33 which discharge at 34 to a conveyor 35 conducting recovered solids to storage or to further use in the oxygen process. Gas transfer line 36 connects the top outlet of cyclone separator 30 to the bottom inlet opening 17 to fluidized bed reactor 10.

Gas transfer line 37 extends from the top outlet of cyclone separator 24 to recycle compressor 38, the outlet of which is connected by gas transfer line 39 to bleed valve 42 which discharges raw product gas to gas separation and purification block 40. This gas is mostly hydrogen but also contains the by-products $^3$He, $^4$He, $N_2$, carbon oxides, $N_2$, $H_2S$ and possibly other species desorbed with the hydrogen. Since this gas is also continuously recycled, the various by-products will shortly after start up be at their steady-state concentrations, assuming constant sloids feed composition. As noted above, $^3$He may have considerable future commercial value as a clean nuclear fusion reactor fuel. The other by-product gases will have immediate value as a source of scarce volatile elements for a manned lunar base.

Equipment block 40, therefore, consists of multiple stages of selectively permeable gas separation membranes and associated compressors, valving and other pressure control devices and cryogenic distillation columns. Detailed arrangement of this equipment, which represents well-known gas purification technology, depends on the composition of by-products to be recovered and their concentration in the raw product gas. The hydrogen and separated by-product gases proceed from block 40 to storage. Gas transfer line 39 is also connected to inlet openings 44 to recycle gas through solids transfer line 26 and reclaim waste heat from these solids.

In the operation of this system, just enough hydrogen recirculation around the process is used to produce mild fluidization at 0.2 ft/sec. The actual operating pressure and temperature is determined by a balance between equipment sizes and weights and the thermodynamics of hydrogen desorption. Lower pressures mean hydrogen can be desorbed at lower temperatures, but lower pressures also mean that vessel diameter must increase to maintain specified velocities and throughputs. At an operating condition of 600° C., 15 psia, for example, a fluidizing velocity of 0.2 ft./sec. requires a recycle hydrogen flow of 65 lb mols/hr in a vessel sized for the 125 metric ton/yr product rate. Adsorbed hydrogen and other by-product gases are removed from the fluidized particles of the regolith and build up in the recycle gas stream. The gas provided for fluidization plus produced gas flows through the various separator cyclones where the particles carried out of the bed are recovered and recycled. The net product gas from the gas stream from fluidized reactor 10 is removed at valve 42 to separation and purification block 40 and then to storage as indicated at 43.

The conditions selected for fluidized bed operation minimize hydrogen pumping costs and particle elutriation problems. However, in this embodiment, it means that preheat bed 49 does not raise the incoming solids temperature more than a few degrees and that the hot solids from transfer line heater 26a bring the hydrogen gas back to nearly 600° C. and then exit the process with little waste heat reclaiming. Therefore, the transfer-line heater 26a and preheat bed 49 serve mainly to protect the continuously operating recycle compressor from high temperatures. While this apparatus and process are effective to recover hydrogen and certain by-products, as described, the heat efficiency makes this process less desirable than others which supplement the heating of the hydrogen used in fluidization.

ANOTHER EMBODIMENT

Figure 2:
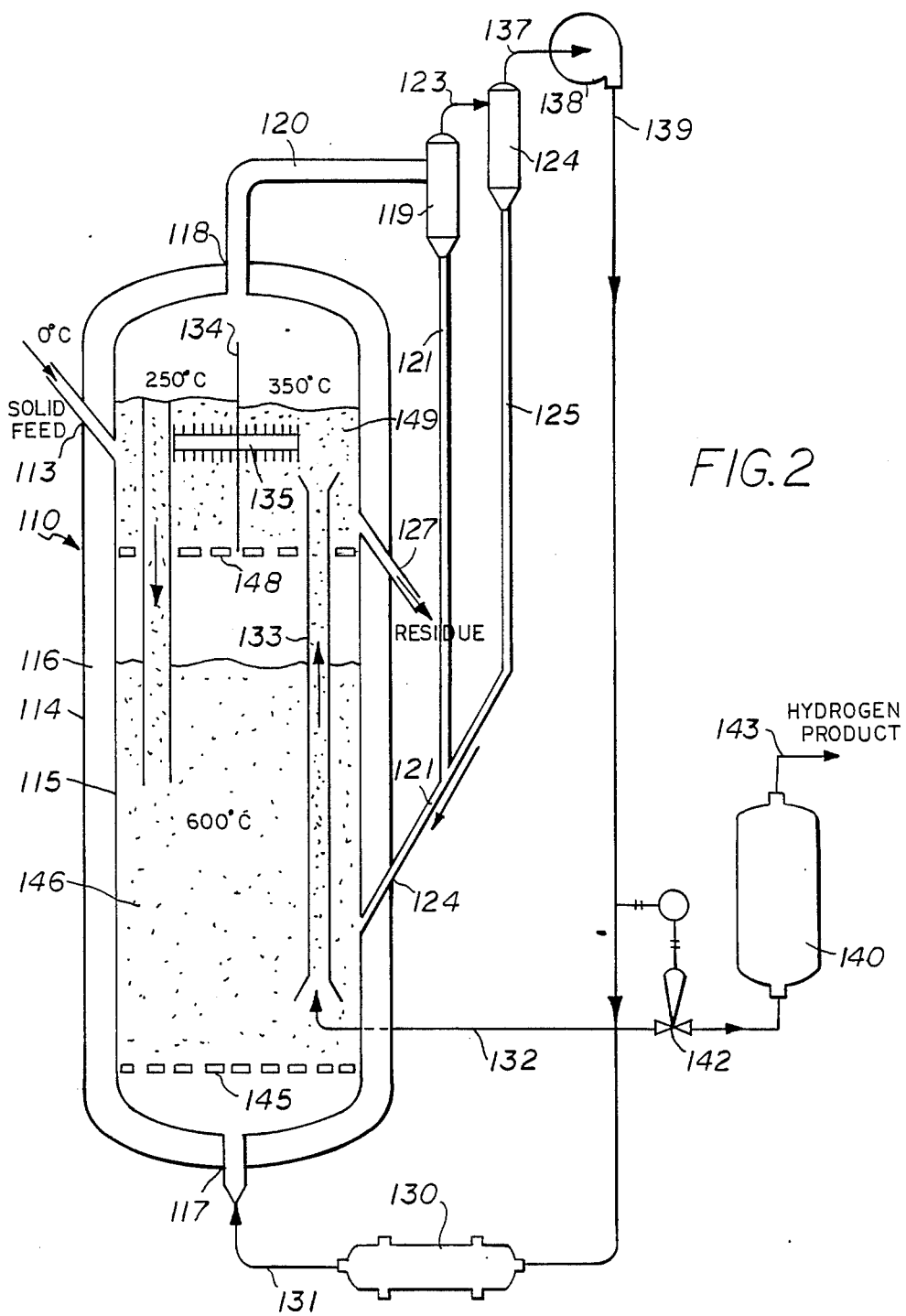
FIG. 2 is a schematic flow diagram of an integrated lunar hydrogen recovery process and apparatus utilizing an RF dielectric heater for direct heating of the recycle hydrogen gas stream to a fluidized bed reactor where regolith particles less than 200 microns diameter are fluidized by a low flow rate of hydrogen at low pressure to strip adsorbed hydrogen from the regolith particles.

In FIG. 2, the embodiment shown comprises a fluidized bed reactor 110 which is supplied with a beneficiated feed of mature regolith particles of less than 200 micron size. The feed is supplied from hoppers 11, as described above, through inlet opening 113 in the fluidized bed reactor. Fluidized bed reactor 110 comprises an outer shell 114 and inner shell 115 with a refractory liner 116 between to maintain the reactor contents at the desired operating temperature.

Refractory liner 116 may be constructed from any of several well-known firebrick formulations, however this makes it quite heavy and greatly increase the weight which must be launched from earth. Alternatives which reduce launched weight are to replace the firebrick with space shuttle heat shield tiles which are excellent lightweight insulators or use lunar soil as the raw material for the lining which would eliminate the need to launch these materials. A fluidizing gas (mostly hydrogen) is introduced through bottom inlet 117 and exits from the outlet 118 at the top of reactor 110. The contents and mode of operation of reactor 110 will be described below.

Five penetrations of the refractory liner are required by the process: solids inlet 113, the fluidizing gas inlet 117; fluidizing gas (and entrained solids) outlet 118; the spent solids (residue) outlet 127; and recycle solids inlet 122. In addition, manways (not shown) are provided to allow a space-suited man to enter and perform internal maintenance as in the oxygen producing process of applicants' co-pending U.S. patent application.

Fluidized bed reactor 110 contains gas distributors 145 and 148, and beds 146 and 149 of fluidized solids. Solids move by gravity from top to bottom bed through downcomer 150. Recycle gas is introduced at the bottom and moves countercurrently upward through the distributors at the minimum velocity (0.2 ft. per minute) sufficient to fluidize the solids in each of the beds.

Gas distributors 145 and 148 at the base of the respective beds 146 and 149 may be any of several designs including fritted disks, simple perforated plates or perforated plates with attachments such as bubble caps to improve gas distribution and prevent solids weeping through the distributors. The solids downcomer 150 is a vertical tube extending from the free surface of upper bed 149 to a point below the free surface of the bed 146 below. The cross-sectional area and height of the downcomer pipe controls the solids throughput and is sized to account for reduced lunar gravity. The top of the downcomer sets the level of the fluidized solids above distributor plates 148.

A cyclone separator 119 has its inlet connected by a gas transfer line 120 to outlet 118 from fluidized bed reactor 110. The bottom of cyclone separator 119 discharges separated solids through its outlet to transfer line 121 to inlet 122 which receives recycled solids. Gas transfer line 123 connects the top outlet of cyclone separator 119 to the side inlet to a second cyclone separator 124. The bottom of cyclone separator 124 discharges separated solids through its outlet to dipleg 125 to transfer line 121 extending to recycle solids inlet 122 on fluidized bed reactor 110. Spent solids (residue) is removed from fluidized bed 149 through outlet 127.

Gas transfer line 137 extends from the top outlet of cyclone separator 124 to recycle compressor 138, the outlet of which is connected by gas transfer line 139 to the inlet end of an RF heater 130, the outlet end of which is connected by transfer line 131 to the fluidizing gas inlet 117 to fluidized bed reactor 110.

The radio-frequency-driven dielectric gas heater 130 is that described in applicants' co-pending patent application. Heater 130 has, as a key component, a cylindrical ceramic honeycomb in the center. The honeycomb consists of many, small parallel channels (1-2 mm square) separated by thin, ceramic walls. These walls are the heat transfer surfaces, so the honeycomb geometry packs a large amount of heat transfer surface into a small volume. Solid-to-gas heat transfer is very efficient and the temperature of gas and adjacent solid in the honeycomb remain quite close up to very high heat transfer rates. The ceramic honeycomb absorbs power from a radio-frequency field imposed by two half-cylinder graphite electrodes surrounding it which are, in turn, connected to an external RF source.

A bleed valve 142 discharges hydrogen gas to separation and purification block 140 and then to collection and storage as indicated at 143 and is also connected to line 132 extending through the wall of reactor 110 to pipe 133 leading to the preheat bed 149. Bed 149 is divided by vertical wall 134 into inlet and outlet sections with a heat pipe 135 extending between the sections.

In the operation of this system, just enough hydrogen recirculation around the process is used to produce mild fluidization at 0.2 ft/sec. or about 65 lb. mols/hr. in a vessel sized for 600° C., 15 p.s.i.a. conditions. Adsorbed hydrogen is removed from the fluidized particles of the regolith and builds up in the hydrogen gas stream. The gas provided for fluidization plus produced gas flows through the various separator cyclones where the particles carried out of the bed are recovered and recycled. The net raw product from the gas stream from fluidized reactor 110 is removed at valve 142 to separation and purification block 140 and then to storage as indicated at 143. This gas separation and purification equipment is identical in design and purpose to that described above as block 40 in FIG. 1.

The process scheme of FIG. 2 was derived to accomplish solid-to-solid heat transfer without transferring via a solids-free gas phase described in FIG. 1 above. Just enough hydrogen passes through the fluidized vessel to produce mild fluidization to minimize hydrogen compression and solids elutriation problems. The primary exchange between entering and leaving solids is accomplished by means of heat pipe 135 in upper fluidized bed 149 divided into inlet and outlet sections by wall 134.

Part of the recycle hydrogen is used to drive recycle riser 133 to send material from the 600° C. zone (bed 146) to the upper bed. An approach of 100° C. is assumed between the two portions of the divided upper bed. The result here is that the nominal thermal load is reduced to about 13 MW equivalent and the nonfluidization-related equipment is modest in size and weight. A rough weight estimate for this system is 200 to 300 metric tons.

The power reactor for this process is a considerable device and must be included in the weight requirement. Estimating the mining power requirement at about 7 MW and the processing requirement at 13 MW for a total of 20 MW requires a reactor system weighing about 700 metric tons (assuming 35 kg/kw). The total hydrogen producing apparatus weight is then of the order of 1,500 to 1,600 metric tons for production of 125 metric tons per year of hydrogen.

While this invention has been described with special emphasis on certain preferred embodiments, it should be understood that, within the scope of the appended claims, this invention may be practiced otherwise than as specifically described herein.

We claim:

1. A lunar hydrogen recovery process comprising
   mining a particulate lunar feed material comprising mature particulate regolith,
   separating a feed from said particulate material comprising particles in the size range of less than about 200 microns,
   providing a fluidized bed reactor with upper and lower, vertically-spaced perforate supports for upper and lower fluidized beds, the upper fluidized bed comprising a preheat bed and the lower fluidized bed comprising a desorption bed, and a downcomer pipe for circulating fluidized particles between said upper and lower beds,
   passing said particulate feed into the upper, preheat bed of said fluidized bed reactor,
   passing said particulate feed from said upper preheat bed through said downcomer pipe into said desorption bed,
   fluidizing said particulate feed in said desorption bed with a hydrogen gas stream at a temperature of about 600° C., to evolve adsorbed hydrogen from said regolith particles leaving a residue of hydrogen-free particles,
   fluidizing said particulate feed in said preheat bed with hydrogen gas flowing from said desorption bed,
   recovering an effluent gas stream comprising said hydrogen gas stream plus desorbed hydrogen from said mature regolith particles,
   continuously removing said hydrogen-free residue particles from said fluidized bed reactor for further use or processing,
   separating net produced hydrogen from said recovered gas stream, and recycling the remaining hydrogen to said desorption bed.

2. A process according to claim 1 in which
said feed is fed by gravity through a screen sized to remove particles having a diameter at least 250 microns,
the under-250 micron particles falling by gravity into an electrostatic size separation device separating particles under 200 microns in size to produce an intermediate feed for use in the process.

3. A process according to claim 1 in which
entrained particulate regolith is separated from said effluent gas stream and recycled to said fluidized bed reactor.

4. A process according to claim 1 in which
entrained particulate regolith is separated from said effluent gas stream and recycled to said desorption bed.

5. A process according to claim 1 in which
said feed is introduced into said upper preheat bed and flows into said lower desorption bed through a downcomer countercurrent to the flow of said hydrogen-containing gas stream through said fluidized bed reactor and is recirculated to the upper preheat bed through a riser.

6. A process according to claim 1 in which
said effluent gas stream and regolith particles entrained therein are passed into a cyclone separator,
entrained particulate regolith is separated from said effluent gas stream in said cyclone separator, cleaned gas is removed from said cyclone separator and recovered particles are recycled to said fluidized bed reactor.

7. A process according to claim 1 in which
said effluent gas stream and regolith particles entrained therein are passed into a cyclone separator,
entrained particulate regolith is separated from said effluent gas stream in said cyclone separator, cleaned gas is removed from said cyclone separator and recovered particles are recycled to said fluidized bed reactor, and
the cleaned gas removed from said cyclone separator is compressed and recycled to said fluidized bed reactor.

8. A process according to claim 7 in which
said recycled gas is treated to remove contaminants prior to introduction into said fluidized bed reactor.

9. A process according to claim 7 in which
by-product gases are separated from the recycled gas prior to introduction into said fluidized bed reactor.

10. A process according to claim 9 in which
the by-product gases separated from the produced hydrogen include various isotopes of helium, nitrogen, hydrogen sulfide, and carbon oxides.

11. A process according to claim 1 in which
entrained particulate regolith is separated from said effluent gas stream and recycled to said fluidized bed reactor, and
said effluent gas stream is recycled to said fluidized bed reactor and heated to about 600°C. by a solid-to-gas RF-dielectric heater.

12. A process according to claim 11 in which
said solid-to-gas RF-dielectric heater comprises a ceramic honeycomb having a plurality of small parallel channels separated by thin, ceramic walls, and
electrodes surrounding said honeycomb connected to an external RF power source,
said hydrogen-containing gas stream flowing through said honeycomb channels to be heated by said dielectrically heated ceramic.

13. A process according to claim 11 in which
said solid-to-gas RF-dielectric heater comprises a metal shell with refractory insulation and a central cylindrical ceramic honeycomb having a plurality of small parallel channels, of the order of 1-2 mm. square, separated by thin, ceramic walls, and
two half-cylinder graphite electrodes surrounding said honeycomb connected to an external RF power source by coaxial cables extending through the shell and insulation,
inlet and outlet nozzles to and from said shell for passage of said hydrogen-containing gas stream through said honeycomb channels in said dielectrically heated ceramic.

14. A process according to claim 11 in which
said heater is operated at 50 MHz absorb and transfer $10^7$ watts/m$^3$ into and through said ceramic honeycomb, generating about $10^6$ Btu/hr-ft$^3$.

15. A process according to claim 1 in which
said effluent gas stream and regolith particles entrained therein are passed into a cyclone separator,
entrained particulate regolith from said effluent gas stream is separated in said cyclone separator, cleaned gas is removed from said cyclone separator and the recovered particles recycled to said fluidized bed reactor,
the cleaned gas removed from said cyclone separator is compressed and recycled to said fluidized bed reactor,
the recycled gas is treated to remove contaminants prior to introduction into said fluidized bed reactor, and heated to about 600° C. by a solid-to-gas RF-dielectric heater.

16. A process according to claim 15 in which
said solid-to-gas RF-dielectric heater comprises a ceramic honeycomb having a plurality of small parallel channels separated by thin, ceramic walls, and
electrodes surrounding said honeycomb connected to an external RF power source,
said hydrogen-containing gas stream flowing through said honeycomb channels to be heated by said dielectrically heated ceramic.

17. A process according to claim 15 in which
said solid-to-gas RF-dielectric heater comprises a metal shell with refractory insulation and a central cylindrical ceramic honeycomb having a plurality of small parallel channels, of the order of 1-2 mm. square, separated by thin, ceramic walls, and
two half-cylinder graphite electrodes surrounding said honeycomb connected to an external RF power source by coaxial cables extending through the shell and insulation,
inlet and outlet nozzles to and from said shell for passage of said hydrogen-containing gas stream through said honeycomb channels in said dielectrically heated ceramic.

18. A process according to claim 1 in which
said feed is introduced into said upper fluidized zone and flows into said lower fluidized zone through a downcomer countercurrent to the flow of said hydrogen-containing gas stream through said fluidized bed reactor and is recirculated to the upper fluidized bed through a riser, said effluent gas stream and regolith particles entrained therein are passed into a cyclone separator, entrained particulate regolith is separated from said effluent gas stream in said cyclone separator, cleaned gas is removed from said cyclone separator and the recovered particles recycled to said fluidized bed reactor, and the cleaned gas removed from said cyclone separator is compressed and recycled to said fluidized bed reactor.

19. A process according to claim 18 in which part of said recycled hydrogen gas stream is introduced into said fluidized bed riser to lift particles from said desorption bed to said preheat bed.

20. A process according to claim 18 in which said upper preheat bed has a vertical wall dividing it into separate sections, said downcomer extending from the section adjacent to the inlet for particulate regolith feed, and has a riser extending into the other section, and a heat exchanger extending between said sections to transmit heat therebetween.

21. A process according to claim 18 in which by-product gases are separated from the recycled gas prior to introduction into said fluidized bed reactor.

22. A process according to claim 21 in which the by-product gases separated from the hydrogen desorbed from said regolith particles include various isotopes of helium, nitrogen, hydrogen sulfide, and carbon oxides.

23. A process according to claim 1 in which hydrogen is recirculated in the process to produce mild fluidization at 0.2 ft/sec., and at an operating pressure and temperature, balancing equipment sizes and weights and the thermodynamics of hydrogen desorption.

24. A process according to claim 23 in which hydrogen is circulated at an operating condition of 600° C., 15 psia, a fluidizing velocity of 0.2 ft./sec., and a flow rate of 65 lb mols/hr in a vessel sized for 125 metric ton/yr product rate.

* * * * *